Aug. 31, 1926.

F. A. COARI

1,598,053

MACHINE FOR SHELLING NUTS

Filed Oct. 23, 1924

F. A. COARI

1,598,053

MACHINE FOR SHELLING NUTS

Filed Oct. 23, 1924     7 Sheets-Sheet 6

Inventor,
Frank A. Coari

Patented Aug. 31, 1926.

1,598,053

UNITED STATES PATENT OFFICE.

FRANK A. COARI, OF CHICAGO, ILLINOIS.

MACHINE FOR SHELLING NUTS.

Application filed October 23, 1924. Serial No. 745,275.

The present machine is designed to effect a removal of shells from nuts which have been previously cracked. It embodies in its construction certain mechanism which both agitates a quantity of nuts and feeds them continuously through the machine. It also incorporates certain other mechanism which intermittently permits the discharge through a special outlet of those nuts which remain whole, whether because of improper cracking, or otherwise.

The exemplification of my invention shown in the accompanying drawings is set forth therein in the manner following:

Fig. 3 is an end elevation of the opposite end of the machine;

As shown, the machine includes in its construction suitably connected end frames 20 and 21 in which are journaled for rotation two upper and two lower roller shafts 22 and 23, respectively. The rollers mounted on these shafts operate in pairs with a slight intervening space. Between the two pairs of rollers is a fifth shaft 24 which is also mounted for rotation between the two end frames.

I have further shown certain panels or side plates 25 and 26 as extending between the two end frames so as to enclose the several rollers. The top of the machine is protected by a suitable cover 27 from which upstands a receiving hopper 28. A discharge hopper 29 is also extended between the two end frames below the lower rollers 23, the walls of this hopper being inclined toward an outlet 30.

A common drive for all five shafts is provided at one end of the machine. For this purpose each of the shafts is extended through the end frame 20, a large gear wheel 31 being applied to the end of the shaft 24. In mesh with this gear wheel are two smaller gears 32 and 33 mounted, respectively, on one of the upper and lower roller shafts 22 and 23. The remaining upper and lower roller shafts are further provided with two gear wheels 34 and 35, respectively, which mesh with certain gears 36 and 37 carried by the first two roller shafts. Power from any suitable source is applied to any one of these shafts, whereby all five shafts are rotated in unison. It will be noted that the two rollers in each pair are revolved oppositely and toward each other. Any sort of a protective housing 38 may be fixed to the end frame 20 so as to cover the gearing arrangement just described.

Figures 10, 11, 12:
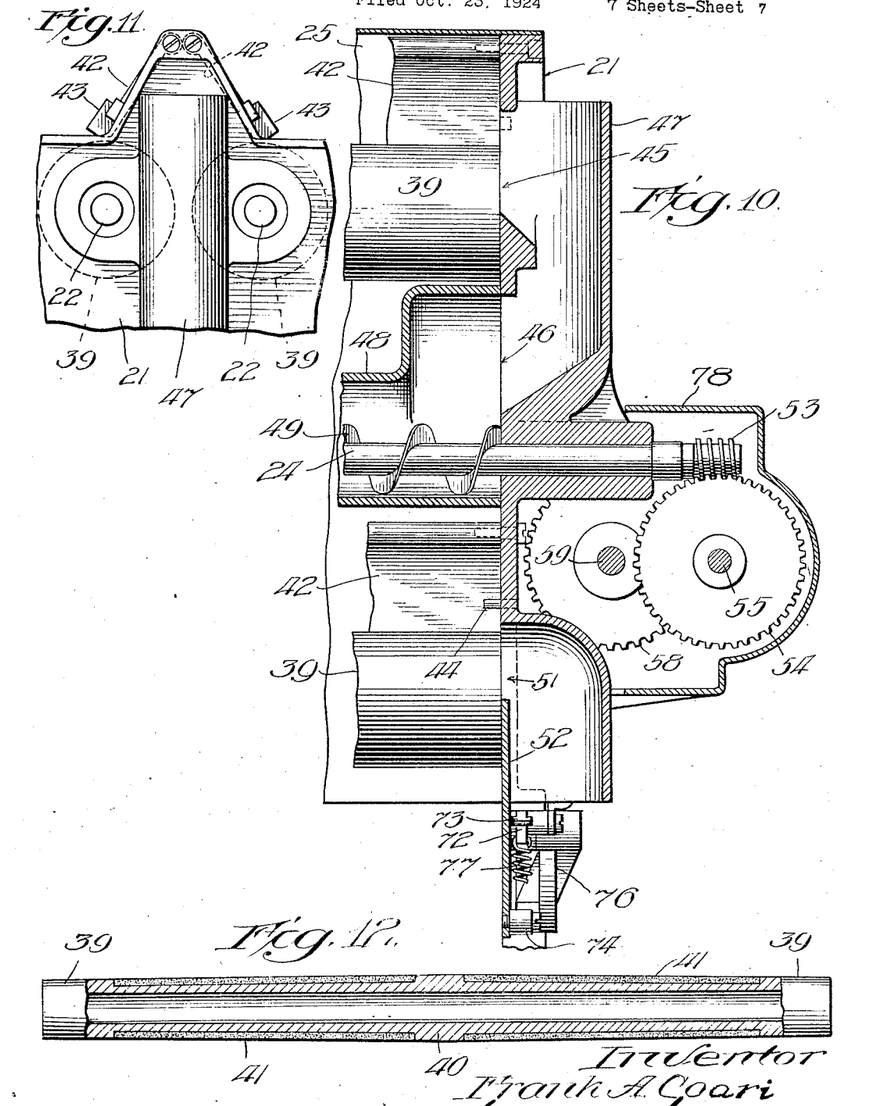
Fig. 11 is a fragmentary detail in elevation looking toward one end of the machine adjacent its top.
Fig. 12 which is a detail in longitudinal section shows the construction of one of the operating rollers.

The construction of the several rollers which are mounted to revolve on the four shafts 22 and 23 is most clearly shown in Fig. 12. From this it appears that each roller is formed with exposed metallic surfaces 39 adjacent its two ends and also with a similarly exposed metallic surface 40 in its center region. Elsewhere the roller is annularly recessed whereby to receive in flush relation a surface of rubber 41, or other suitable frictional material. Each of the upper rollers is furthermore slightly tapered downwardly from its center toward its two ends. The lower rollers, however, differ in this one respect only—their diameter is uniform from end to end.

Associated with each pair of rollers are two scraper plates 42 having their upper edges pivoted to the end frames 20 and 21 at points which are adjacent the machine top, each plate being provided further with a weighted portion 43 along its lower edge. Each pair of scraper plates are downwardly diverged so as to present their lower or scraping edges close to the rollers. Actual contact with the rollers is prevented as by means of stop pins 44. A very narrow space between each scraper plate and its associated roller is thereby provided, the scraper edge being sufficiently close to dislodge from the roller surface any nut particles which might tend to remain thereon.

Each end frame is provided with an opening 45 between the two upper rollers, and also with another opening 46 therebelow just above the shaft 24. Connecting these two openings at each end of the machine is a chute 47 which is mounted on the exterior thereof. These latter two openings 46 are in communication with opposite ends of an elongated housing 48 surrounding a spiral conveyor 49 which is mounted on the shaft 24. One end of the conveyor housing, preferably that which is proximate to the driving gears, is in communication with a hopper 50 disposed immediately above the two lower rollers 23 adjacent one end thereof. At the opposite roller ends in the end frame 21 is an outlet opening 51 with which is associated a slide gate 52, having operating means therefor now to be described.

A worm screw 53 which is carried at one end of the shaft 24 engages with a gear 54 mounted on a horizontal shaft 55 which is supported in suitable bearings 56 extended from the end frame 21. Mounted on this same shaft is a second gear 57 of smaller size in mesh with a larger gear 58 having a fast mounting on a second shaft 59 whereon are also mounted two flanged collars 60 and two cams 61.

Each cam has capacity for a limited rotative adjustment upon the shaft 59, and for this purpose may be provided with a curved slot 62 concentric with its axis of rotation, there being a stud bolt 63 entered through this slot to connect with the collar flange proximate thereto. The periphery of each cam is circular throughout its major portion but elsewhere recedes sharply as at 64 to provide a shoulder from which a gradually tapered surface 65 leads to the circular peripheral portion.

Figure 1:
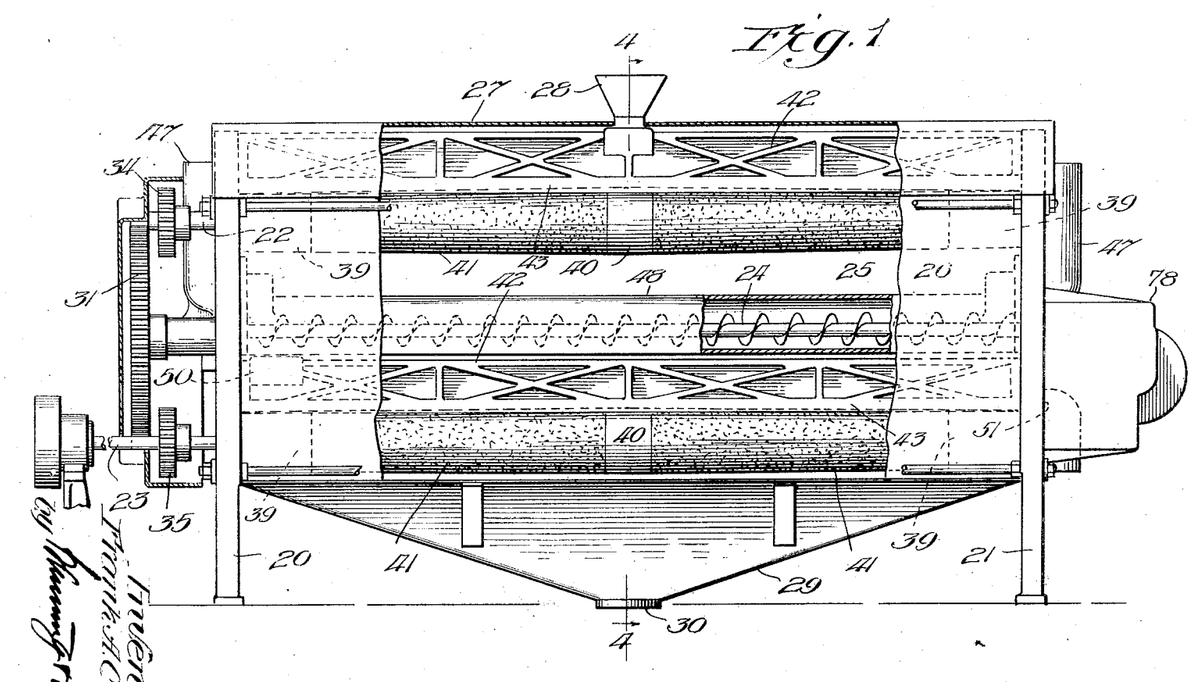
Figure 1 is a side elevation of the entire machine with the near side panel broken away to exhibit certain of the interior operating parts.
Figure 2:
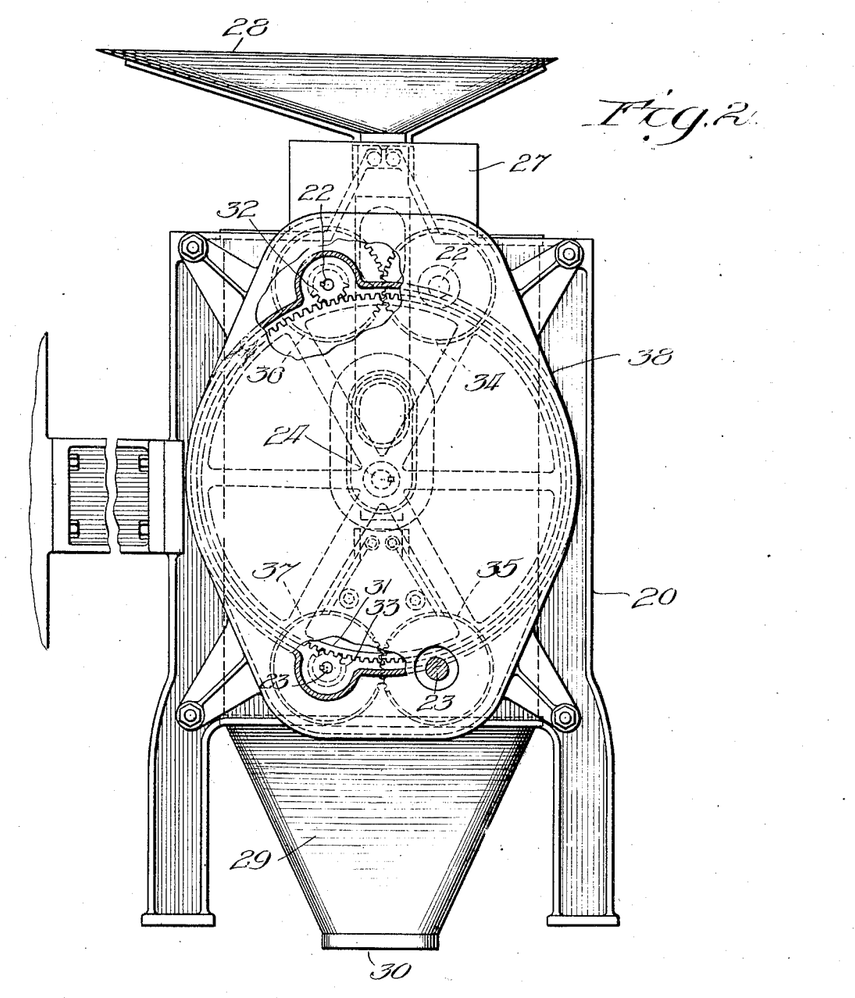
Fig. 2 is an elevation of the machine end to which power is applied.
Figure 4:
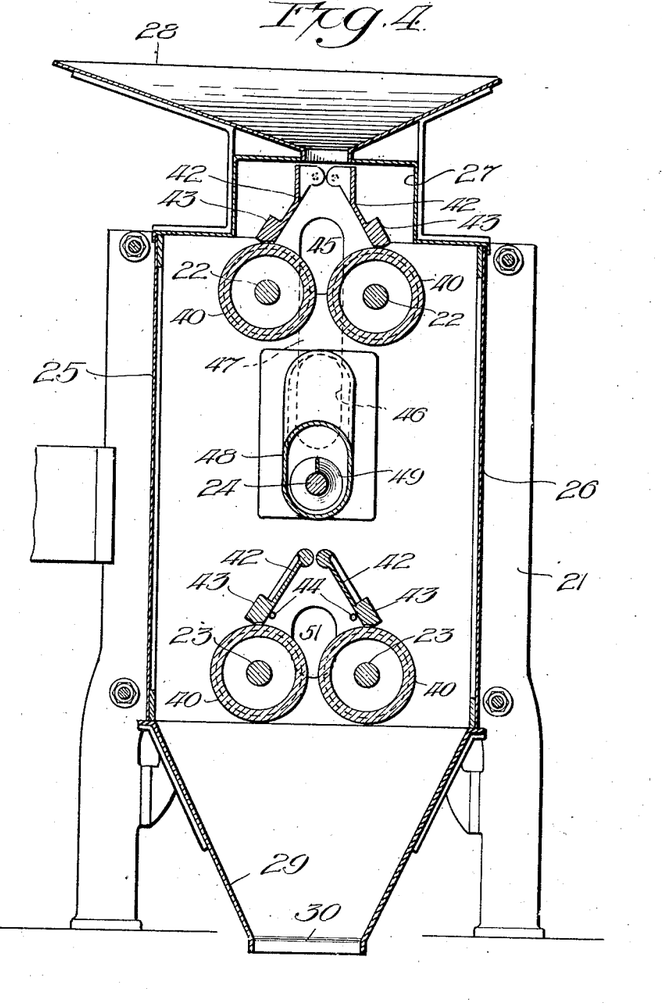
Fig. 4 is a transverse section through the machine taken on line 4—4 of Fig. 1.
Figure 5:
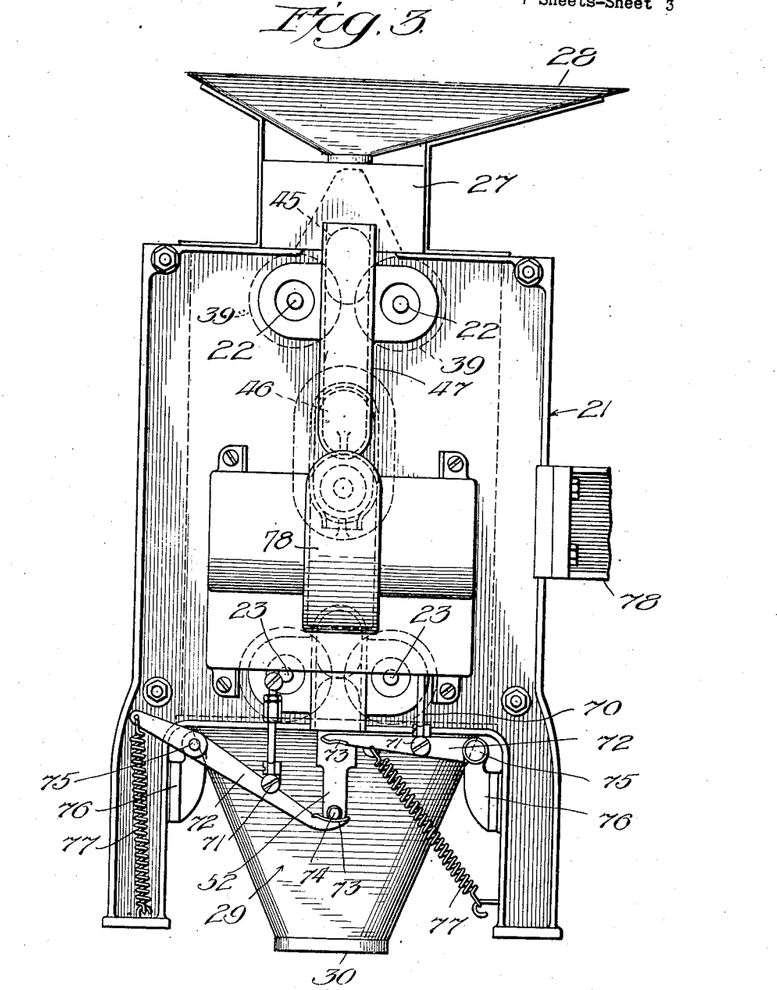
Fig. 5 is an enlarged detail in elevation of the mechanism at the delivery end of the machine, a housing which covers part of the mechanism being shown in section.
Figure 6:
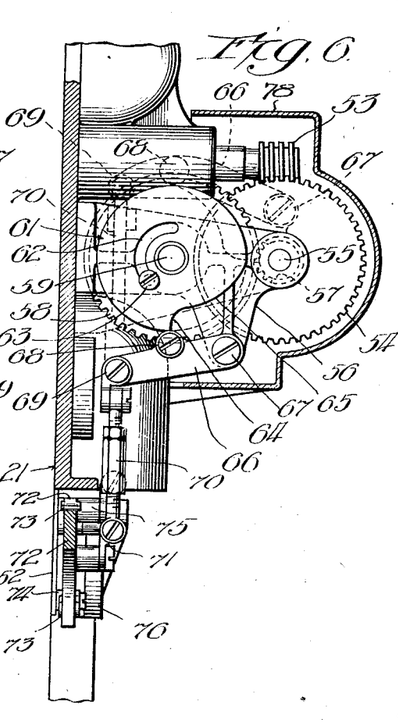
Figs. 6 to 10 inclusive are sectional details taken respectively on lines 6—6, 7—7, 8—8, 9—9 and 10—10 of Fig. 5.
Figures 7, 9:
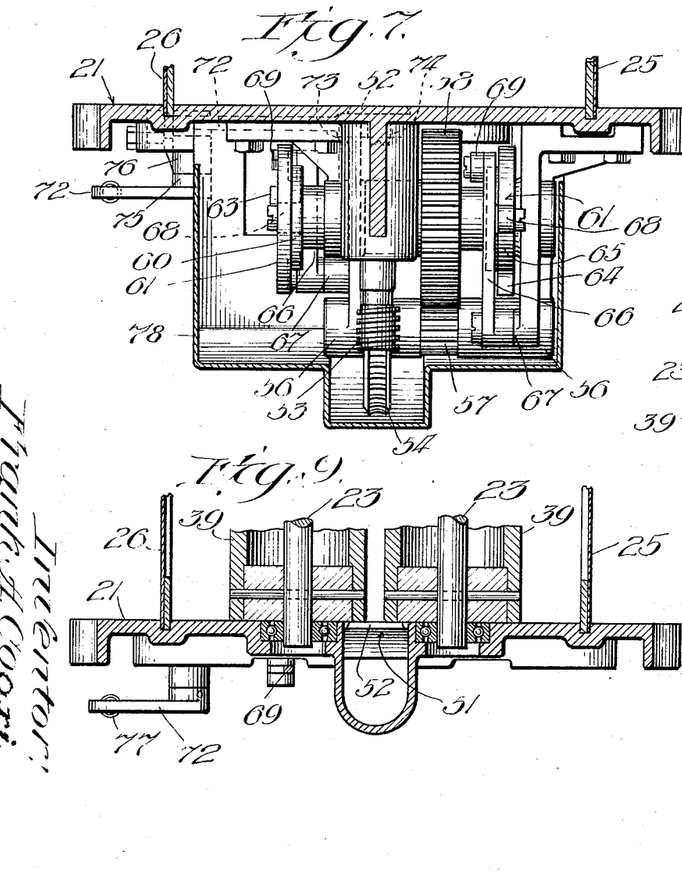
Figure 8:
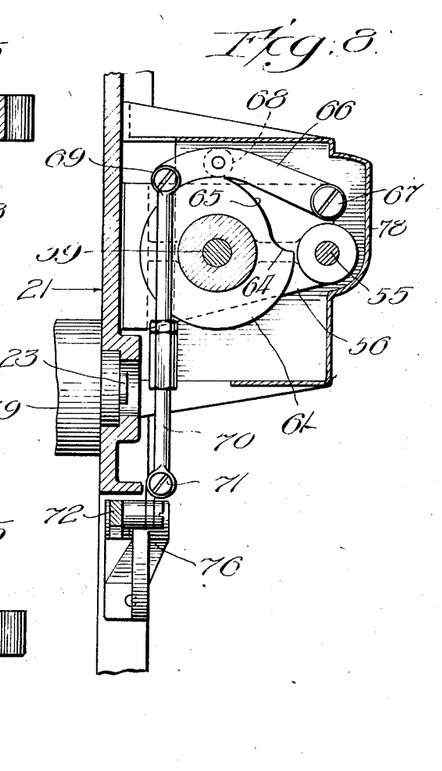

Associated with each cam is a lever 66 fulcrumed as at 67 to an arm extending from the bearing 56, each lever having a roller 68 adapted to engage with the cam periphery. Connected to the free end of each lever as at 69 is an adjustable link 70 which extends downwardly to connect as at 71 with a lever 72 having a shoe 73 in operative relation to a roller 74 at the lower end of the gate 52. Each lever 72 is fulcrumed as at 75 to a bracket 76 which is carried by the end frame 21, and has connection with a tension spring 77 which tends to hold its working end in engagement with the roller 74. It will be noted that the shoe 73 of one lever overlies, and the other underlies, the roller 74 whereby a two-way motion to the gate is assured, but that the upper shoe may remain suspended and away from the gate roller during certain portions of the cam movements (see Figs. 3 and 5). In the operation of the cam mechanism, first one link 70 and then the other will be moved up and down to rock the two levers 72 in accordance with a predetermined timed relation. The gate is actuated in response to these movements of the two levers (assisted by the springs 77) whereby it is kept in an upper or closed position for a desired time interval. The time and extent of these movements may be adjusted by changing the relative rotative positions of the two cams, also by varying the length of the two links 70. It is contemplated that some sort of a friction lock may be associated with the gate whereby it will remain suspended after the support of the lifting lever is withdrawn. Due to the fact that the working ends of these two levers may normally stand apart an appreciable distance, it is possible for either to impart motion to the gate without interference on the part of the other, thus permitting of a greater latitude in adjustments of their respective movements. Surrounding the principal part of the gate operating mechanism just described is a housing 78 which may be secured to the end frame 21.

In the use of the present invention it may be found desirable to have the same located adjacent a nut cracking machine. The nuts cracked by the one machine are delivered into the receiving hopper 28 of the present mechanism, and from thence fall down into the troughlike space between the two upper rollers 22. The scraper plates 42 serve to confine the nuts during the resulting tumbling operation. The smooth metal portions 39 and 40 of these rollers have very little effect upon the nuts, but elsewhere produce an agitation and tumbling of the nuts such that they are broken into halves or finer particles. Such broken pieces of the nuts fall through between the rollers and drop down into the hopper 29 to pass through the outlet 30 thereof.

The nuts passing from the receiving hopper into the machine are deposited upon the upper rollers at a point remote from their ends. At once there is a separation of the nuts into two oppositely moving streams which proceed toward the roller ends. This travel of the nuts in opposite directions along the two upper rollers is enhanced by the taper of their surfaces. With continued operation of the machine a quantity of nuts passes through the two chutes 47, some of them going directly by gravity into the hopper 50 preliminary to contact with the lower rollers 23. The remainder of the nuts which pass through the chute 47 adjacent the frame end 21 are fed mechanically by the spiral conveyor 49 to the opposite end of the machine for deposit in the receiving hopper 50. It thus results that all of the nuts which are not broken up by the upper rollers are subjected to a further treatment by the lower rollers.

With continued operation of the machine, the nuts deposited between the lower rollers are moved endwise thereof toward the opening 51. A certain quantity of the nuts which are not broken up, whether due to faulty cracking or otherwise, are discharged through this opening. It is desired however, that the travel of the nuts toward this opening be retarded periodically so as to impose a back pressure upon those nuts which remain between the lower rollers. It is for this reason that I have provided means for intermittently opening and closing the gate 52 whereby the discharge of nuts through the opening 51 may be controlled according as is found most desirable.

It is manifest, of course, that the machine of my invention may be embodied in forms other than the one herein shown and described, but in so far as use is made of the principles which underlie my invention, I desire that the same be included within the scope of this patent, as defined by the claims below.

I claim:

1. A nut shelling machine in which is comprised a housing, two pairs of connected rollers mounted in spaced relation one pair above the other within the housing, a pair of scraper plates adjacent each pair of rollers providing an enclosed space thereabove, means for feeding nuts to the upper rollers at a point intermediately of their ends whereby the nuts are divided into two streams traveling in opposite directions, and means for feeding the two nut streams from opposite ends of the upper rollers to a single end of the lower rollers whereby each pair of rollers may operate successively upon a quantity of nuts, substantially as described.

2. A nut shelling machine having in combination two pairs of rollers arranged one pair above the other, the upper rollers being tapered toward the opposite ends thereof, means for feeding nuts to the upper rollers at a point intermediately of their ends whereby the nuts are provided into two streams having opposite directions of travel, a spiral conveyer parallel with the rollers and intermediately of the two pairs thereof, means providing an enclosure above each pair of rollers, a chute connecting the enclosure for the upper rollers at one end with the spiral conveyor and adapted to feed one stream of nuts thereto, a second chute connecting the other end of the upper rollers with the corresponding end of the lower rollers and adapted to conduct the other stream of nuts thereto by gravity, and means connecting the spiral conveyor with the chute last mentioned, substantially as described.

3. In a nut shelling machine, the combination of a pair of rollers interconnected in a manner whereby they are revolved in unison and in opposite directions, a pair of scraper plates adjacent the rollers and forming an enclosure thereabove, each of the plates having a scraper edge which is proximate to one roller but yieldable with respect thereto, means for delivering a supply of nuts into the enclosure above the rollers, and means permitting a periodic discharge of certain of the nuts from said enclosure, substantially as described.

4. A nut shelling machine comprising, in combination, two pairs of rollers one pair arranged above the other and having a common drive, means providing an enclosure above each pair of rollers, means connecting the opposite ends of the enclosure for the upper rollers with a single end of the enclosure for the lower rollers whereby nuts may travel downwardly in two streams from one to the other, and a mechanically operated feed device interposed in said connecting means adapted to operate upon one nut stream therein, substantially as described.

5. A nut shelling machine comprising, in combination, two pairs of rollers one pair arranged above the other and having a common drive, means for feeding nuts to the upper rollers at a point intermediately of their ends, means for feeding the nuts longitudinally of the rollers in two oppositely moving streams, means providing an enclosure above each pair of rollers, and conducting means connecting opposite ends of the enclosure for the upper pair of rollers with a single end of the enclosure for the lower rollers whereby the two nut streams may travel from one to the other and unite when delivered to the lower rollers, substantially as described.

6. A machine for shelling cracked nuts in which is comprised means for agitating and tumbling about a quantity of nuts, there being an outlet through which the whole nuts may be discharged, a gate for closing the outlet, and means whereby the gate may be periodically opened and closed, substantially as described.

7. A machine for shelling cracked nuts in which is comprised means for acting upon the nuts to dislodge the shells therefrom, there being an outlet through which the whole nuts may be discharged, a gate for opening and closing said outlet, means for operating said gate, and adjusting means whereby the operation of said gate may be timed, substantially as described.

8. A machine for shelling cracked nuts in which is comprised a rotating mechanism, a driving means therefor, a gate controlling the discharge of nuts from said mechanism, and an operating means for the gate drivingly connected with the rotating mechanism, substantially as described.

9. A machine for shelling cracked nuts having a discharge opening, a slide gate for opening and closing said opening, and means for operating said gate in which is included a pair of rotatively adjustable cams, a device engaged by each cam, a pair of levers each adapted to engage with the gate to reciprocate the same, an adjustable connection between each lever and the device, the two cams being so adjusted as to effect an alternate movement of the two levers, substantially as described.

10. A machine for cracking nuts having a discharge opening, a gate associated with said opening, an operating means therefor including a continuously rotating driving member, a pair of levers adapted to engage successively with the gate to reciprocate the same, and connections between each lever and the driving member including a pair of cams rotatively adjustable to permit of variations in the timing of the gate operation, substantially as described.

11. A machine for shelling nuts in which is comprised two pairs of rollers, and means for feeding nuts to one pair of rollers and therefrom to the other in a manner requiring the nut stream to traverse one half the length of one and the full length of the other pair of rollers, substantially as described.

12. A machine for shelling nuts in which is comprised two pairs of rollers, nut conducting means connecting the two pairs of rollers, and means for mechanically feeding a portion only of the nuts which travel through said conducting means, the balance of said nuts being fed by gravity, substantially as described.

13. A machine for shelling nuts in which is comprised two pairs of rollers, means for feeding nuts along a portion of the length of one pair and for the entire length of the other pair of rollers, and a periodically operated back pressure mechanism for controlling the discharge of nuts from one pair of rollers, substantially as described.

FRANK A. COARI.